April 6, 1954     S. R. OVSHINSKY     2,674,332
AUTOMATIC PILOT MECHANISM FOR SELF-PROPELLED VEHICLES
Filed March 6, 1953     7 Sheets-Sheet 1

INVENTOR
STANFORD R. OVSHINSKY
BY Roger B. McCormick
ATT'Y.

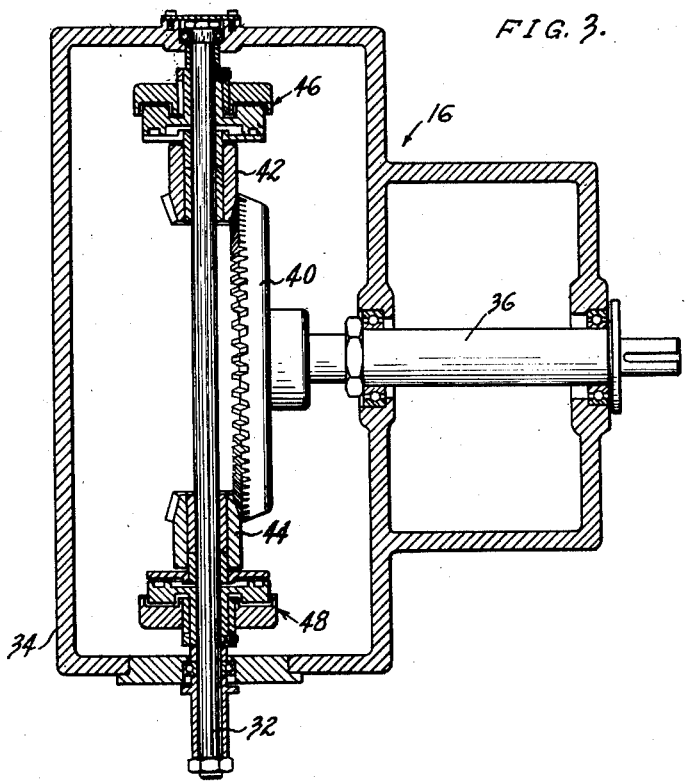
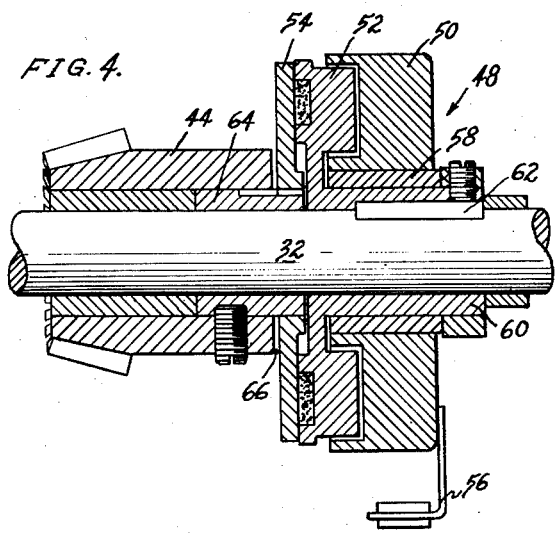

INVENTOR
STANFORD R. OVSHINSKY
BY Roger B. McCormick
ATT'Y.

April 6, 1954  S. R. OVSHINSKY  2,674,332
AUTOMATIC PILOT MECHANISM FOR SELF-PROPELLED VEHICLES
Filed March 6, 1953  7 Sheets-Sheet 4
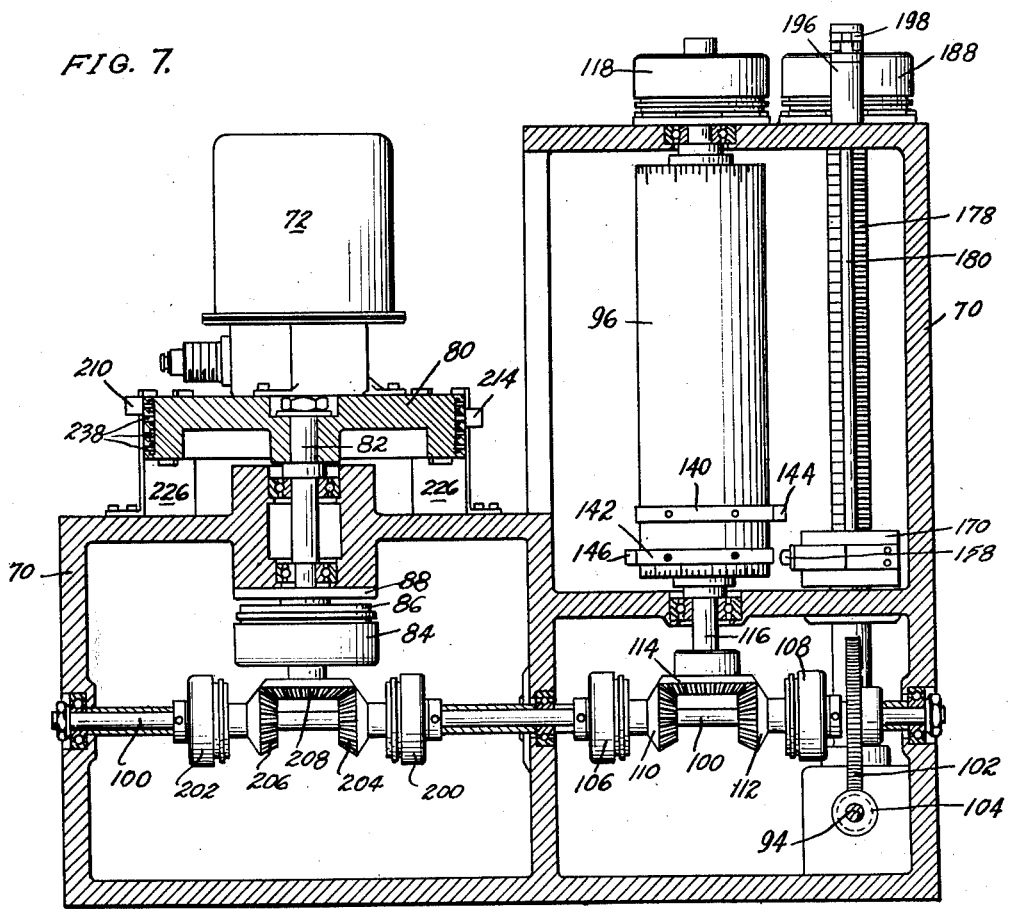
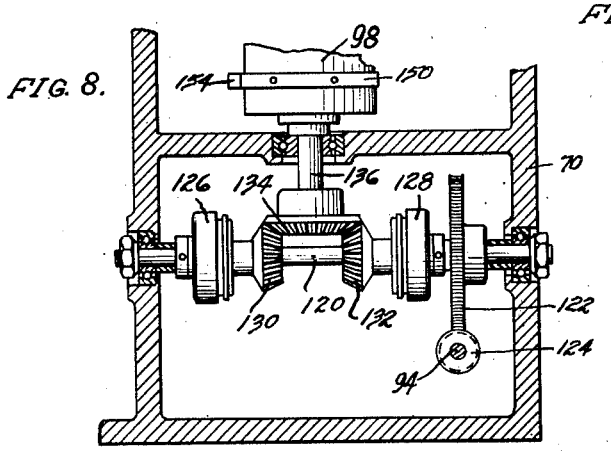
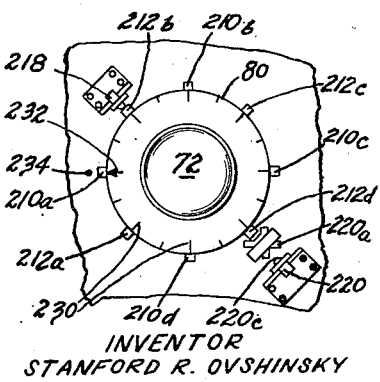
INVENTOR
STANFORD R. OVSHINSKY
BY Roger B. McCormick
ATT'Y.

April 6, 1954  S. R. OVSHINSKY  2,674,332
AUTOMATIC PILOT MECHANISM FOR SELF-PROPELLED VEHICLES
Filed March 6, 1953  7 Sheets-Sheet 5

INVENTOR
STANFORD R. OVSHINSKY
BY Roger B. McCormick
ATT'Y.

April 6, 1954  S. R. OVSHINSKY  2,674,332
AUTOMATIC PILOT MECHANISM FOR SELF-PROPELLED VEHICLES
Filed March 6, 1953  7 Sheets-Sheet 7

INVENTOR
STANFORD R. OVSHINSKY
BY Roger B. McCormick
ATT'Y.

Patented Apr. 6, 1954

2,674,332

UNITED STATES PATENT OFFICE 2,674,332

AUTOMATIC PILOT MECHANISM FOR SELF-PROPELLED VEHICLES

Stanford R. Ovshinsky, Detroit, Mich.

Application March 6, 1953, Serial No. 340,853

18 Claims. (Cl. 180—79.1)

This invention relates to steering control apparatus and, more particularly, to improvements in automatic pilot mechanism for self-propelled vehicles of the type shown and described in my co-pending application for patent Serial No. 267,865, filed January 23, 1952.

It is the general object of the invention to provide automatic pilot mechanism which can be installed as an accessory upon a self-propelled vehicle, such as a tractor, and which can be set into operation to assume complete steering control of the vehicle and guide the same over a preselected pattern or course of operation.

Another object of the invention is to provide an automatic pilot for the aforementioned purpose and which can be pre-adjusted to pilot the vehicle over any one of a plurality of patterns or courses of operation.

A more specific object of the invention is to provide an automatic pilot having the foregoing characteristics and which includes both direction sensitive control means and travel sensitive control means coordinated to guide the vehicle without the aid of remotely positioned control apparatus and without requiring the services or attendance of an operator.

Other objects as well as advantages of the invention will become apparent to those skilled in the art from the following description taken in connection with the annexed drawings which, by way of example only, illustrate a preferred and one alternative construction and in which, Fig. 1 is a side view of a tractor showing the general arrangement of the components of the automatic steering control apparatus;

Fig. 3 is a cross-sectional view taken as indicated by line 3—3 of Fig. 1 and showing in detail the components of the steering drive forming a part of the invention;

Fig. 4 is a detail view of an electrically operable clutch utilized in the steering drive;

Fig. 7 is a vertical cross-sectional view taken as indicated by line 7—7 of Fig. 5 and showing components of the direction sensitive control means and the drive connections therefor;

Fig. 8 is a fragmentary vertical cross-sectional view taken as indicated by line 8—8 of Fig. 5 to show details of components of the travel sensitive control means;

Fig. 13 is a detail view of the gyro table showing the switch arrangement as used for the pattern of Fig. 12;

Figure 1:
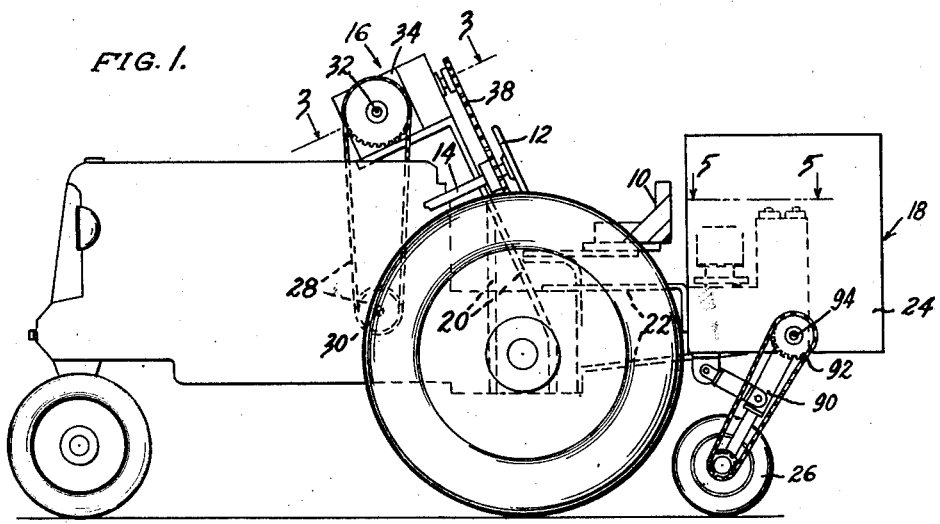
Figure 2:
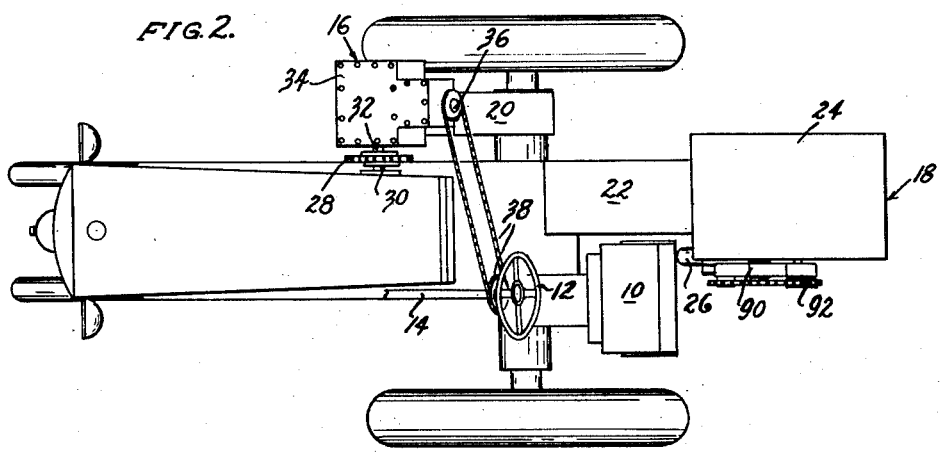
Fig. 2 is a top plan view of the tractor.

Referring now to Figs. 1 and 2 with greater attention to detail, it will be noted that the tractor shown therein is of conventional design and is adapted to be manually operated or piloted by a person sitting in the seat 10 and manipulating the steering wheel 12 which is connected to and operates conventional steering linkages by means of the steering column or shaft 14.

In accordance with the present invention, accessory apparatus, comprising a steering drive unit 16 and steering control apparatus 18, are mounted upon the tractor to assume fully automatic pilot operation of the tractor. It will be noted that the steering drive unit 16 is mounted on one side of the tractor and that the control apparatus 18 is mounted on the rear thereof so as not to interfere with the vision and movements of a driver during manual pilot operation of the tractor. More specifically, the unit 16 is mounted, as by bracket 20, on the rear axle housing to the right side of the tractor, away from the driver's side, and the apparatus 18 is mounted rearwardly of the tractor as upon bracket means 22 extending from the rear axle housing. The apparatus 18, all of the components of which are disposed within a box-like housing 24, is also supported in part upon an odometer wheel 26 which, as will be described more fully hereinafter, furnishes the drive for the control unit.

The steering drive unit

The steering drive unit 16 is preferably powered by the tractor. This power connection is effected by motion transmitting means comprising, for example, a chain and sprocket drive 28 interconnecting the power take-off shaft 30 of the tractor to an input shaft 32 included in the unit 16. As more particularly shown in Fig. 3, a housing 34 encloses the components of the steering drive unit 16 and the input or drive shaft 32 is journalled adjacent its ends by the said housing.

A driven shaft 36 is also journalled by the housing 34 to extend outwardly therefrom at a right angle to the input shaft. The driven or output shaft 36 is connected by motion transmitting means, comprising, for example, a chain and sprocket drive 38, to the steering column 14 of the tractor whereby the steering linkages of the tractor will be actuated for turns in response to rotation of the driven shaft 36.

As a feature of the present invention electrically operable means are provided to effect selective driving engagement between the drive shaft 32 and driven shaft 36 whereby the driven shaft is rotated to automatically effect turns and steering corrections of the tractor and the same means permits manual steering operation without interference from the steering drive unit 16.

The said means includes a first bevel gear 40 fixed to the inner end of the driven shaft 36 and engaged in diametrically opposed locations by a pair of bevel gears 42 and 44, each of which is rotatably supported on the input shaft 32. A pair of electric clutches 46 and 48 are operatively connected to the gears 42 and 44, respectively, to effect selective driving connection between the said gears 42 and 44 and the drive shaft 32. It will, of course, be understood that if gear 42 is drivingly connected to drive shaft 32, gear 40 and driven shaft 36 will be rotated in the opposite direction. Assuming then that the tractor power take-off shaft 30 and the drive shaft 32 are rotated counterclockwise as viewed in Fig. 1 whenever the tractor is clutched into forward movement, engagement of gear 42 by means of clutch 46 will rotate driven shaft 36 so as to effect a left turn of the tractor. Engagement of gear 44 by means of clutch 48 will rotate driven shaft 36 so as to effect a right turn of the tractor. At times when a turn is unnecessary to effect the desired steering control, both clutches 46 and 48 are de-energized and drive shaft 32 rotates freely without driving connection with the driven shaft 36.

Also, when the tractor is manually piloted the clutches 46 and 48 are de-energized permitting free rotation of the driven shaft in response to manual rotation of the steering column or shaft 14.

While a comprehensive description of the specific structure of the clutches 46 and 48 is not of the utmost importance, a brief description of the details of clutch structure and operation will further the understanding of the invention, because other similar clutches are utilized in the drive structure of the automatic pilot mechanism.

Fig. 4, for the purposes of illustration, shows details of clutch 48. It will be observed that the clutch has three principal components, namely, a field element 50, a rotor 52 and an armature 54. The field element 50 is formed as an annular member which is connected to electrical wires (not shown) which are supported by a grommet 56. The field member is mounted on a sleeve 58 within which the hub 60 of the rotor 52 rotates, the said hub being secured to the input shaft 32 as by a key 62. The body portion of the rotor 52 extends radially and rotates between the field member 50 and the armature 54, the plate-like armature being splined to a sleeve 64 which rotatably embraces the shaft 32 and which is secured to the hub of the gear 44.

During non-engagement of the clutch 48 (when the field is de-energized) the input shaft 32 and rotor 52 rotate freely or without causing the armature 54 and gear 44 to be rotated. During such periods of operation, the armature may shift axially within the space indicated by the numeral 66.

However, when the field is energized, thereby imposing a field of magnetic flux through the rotor and armature, the armature 54 is shifted axially to the right to the position shown in Fig. 4 and is magnetically engaged with the rotor 52 for rotation therewith. Rotation of the armature is, of course, accompanied by rotation of the gear 44 thereby causing a right turn of the vehicle as previously described.

In accordance with the present invention, the control apparatus 18 includes coordinated direction sensitive and travel sensitive means for selectively energizing the steering drive clutches 46 and 48 to effect left and right turning movements, respectively, of the tractor thereby to automatically carry out steering control of the tractor over a preselected pattern or course of operation. At this point it should be noted that clutches of the aforementioned type are commercially available with adjustable torque limiting features. That is, by including means for adjustably varying the potential to the clutches, the torque load limits can be preselected. Accordingly, the torque limits of the clutches 46 and 48 can be selected to prevent mechanical damage to the steering drive mechanism and to permit an attendant to over-ride the steering drive mechanism during automatic steering control operation or to utilize the steering drive for power steering purposes.

The structure and physical association of the components making up the apparatus which controls the afore-described steering drive mechanism will now be described.

The control apparatus

Figure 5:
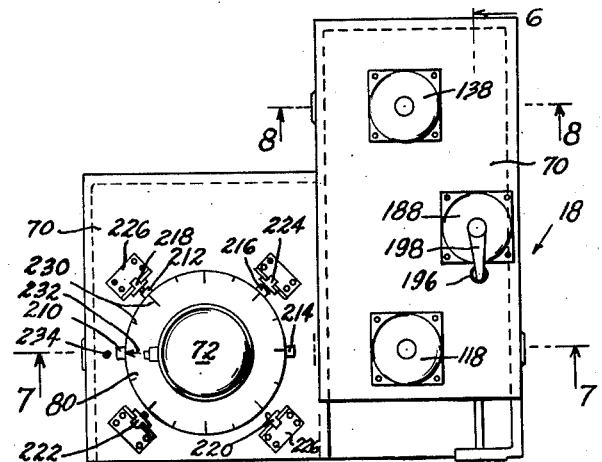
Fig. 5 is a top plan view of the housing which supports components of the direction sensitive and travel sensitive control means.
Figure 6:
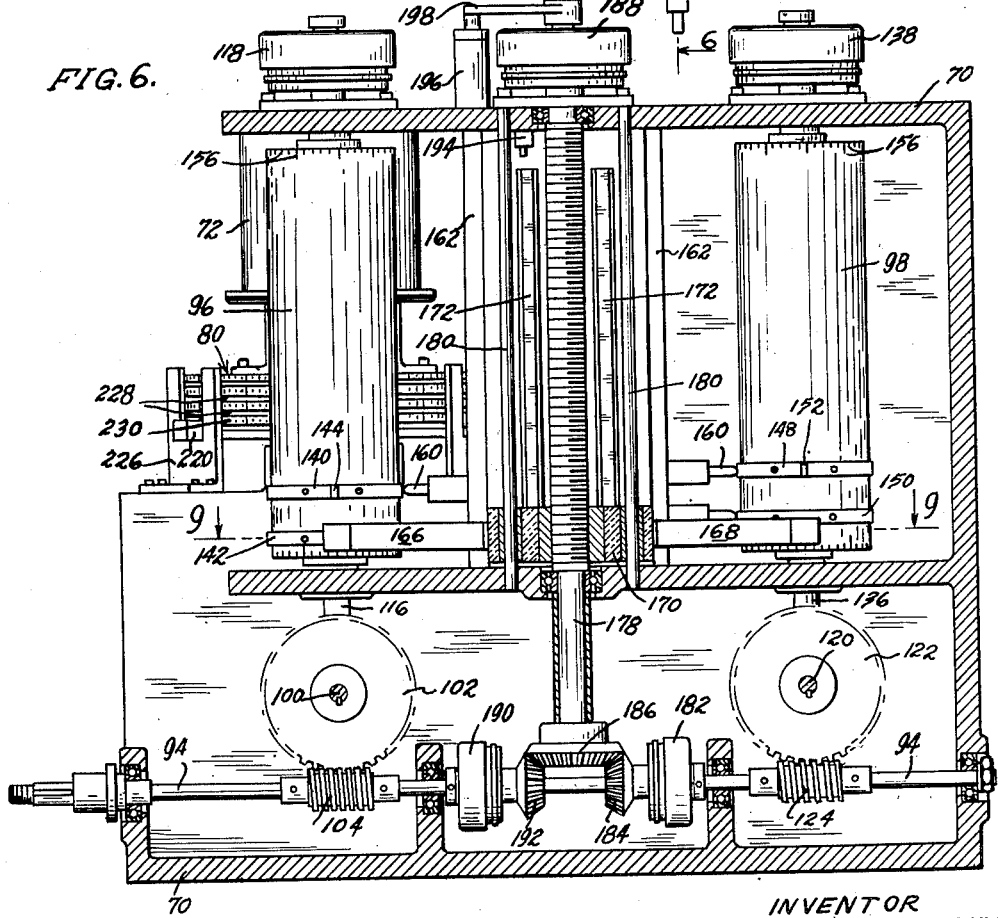
Fig. 6 is a vertical cross-sectional view taken as indicated by line 6—6 of Fig. 5 and showing components of the travel sensitive control means and the drive therefor.

As more particularly shown by Figs. 5, 6 and 7, the major components of the unit 18, including the direction sensitive and the travel sensitive control means, are disposed within a casing 70 which is located within the box-like housing 24 supported rearwardly of the tractor. In the said figures of the drawings, no attempt has been made to show the exact structure and location of the more conventional elements such as the relays, switches, the circuit wires, etc. which are included in the control or automatic pilot unit. Such conventional elements are shown diagrammatically in the wiring circuit of Fig. 11, it being understood that such elements are commercially available in many satisfactory forms. Throughout the following description, there will be frequent reference to Fig. 11 and the conventional elements shown therein to further the understanding of the function of the components described.

Figure 11:
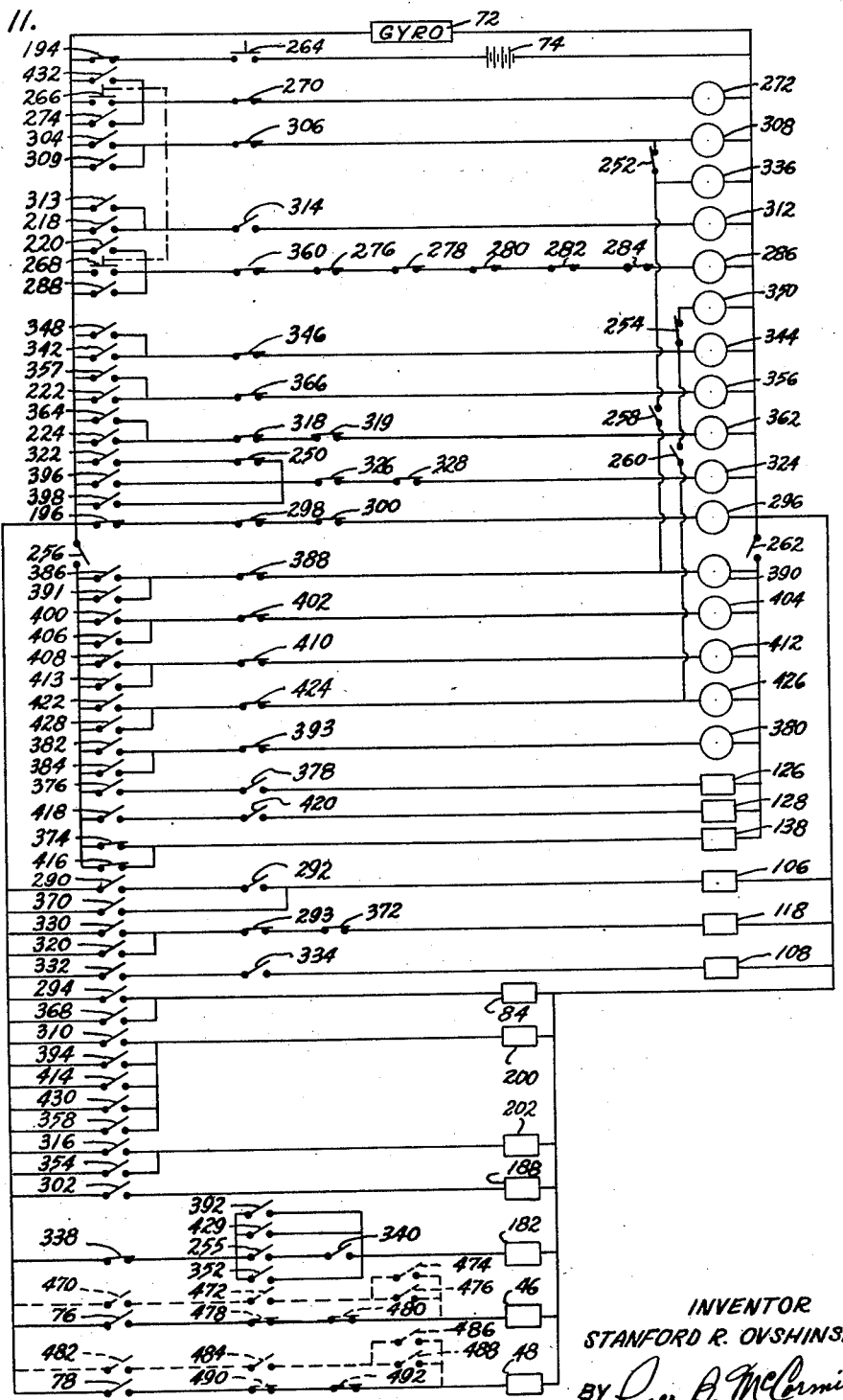
Fig. 11 is a wiring diagram which includes all of the electrical components utilized in the pilot mechanism.

As heretofore mentioned, the control unit 18 includes direction sensitive control means. The principal component of the direction sensitive means is a gyroscope 72. The gyroscope is of conventional design and requires no detailed consideration. However, it should be understood that the gyroscope receives its power from a source of electrical energy such as a battery 74 (Fig. 11) which provides the energy source for electrical operation of the entire control unit. It should also be understood that, preferably, the gyro is the slaved type, i. e., it effects correction to magnetic North, and that associated with the gyro are conventional phase sensitive amplifiers, etc. (not shown) constituting servo means for opening and closing servo switches 76 and 78 (Fig. 11). Therefore, in accordance with conventional practice, the gyro will actuate servo means in response to deviations of a vehicle from a preselected heading.

This conventional function of the gyro 72 is put to a useful purpose in the present installation by mounting the gyro upon a table 80 supported by the casing 70 for rotatable adjustment. The direction sensitive elements of the gyro are, of course, free to rotate relative to the table 80 and it will be understood that at one rotated position of the table relative to the direction sensitive elements the gyro will be in "neutral" position and generating no servo energy thus indicating no deviation from a selected heading with reference to magnetic North. If the table 80 is then locked relative to the tractor in the said rotated position, deviations of the tractor from the selected heading will be recorded by the gyro and amplified as servo response selectively closing the switches 76 and 78.

For example, if the table 70 is "neutralized" and locked to the tractor with the tractor heading East, deviations to North or South taken by the tractor during movement will result in closing the switch 76 or 78. Assuming that a right turn or South deviation will result in closing of servo switch 76, such action can be utilized to effect a correction turn to the left by including switch 76 in circuit with steering drive clutch 46, as shown in Fig. 11, thereby energizing the clutch for a left turn as previously described. In the correcting left turn, the tractor will again assume an "on heading" course wherein the table 70 is "neutralized" and whereupon the servo switch 76 is de-energized and opened. If a left turn deviation occurs, servo switch 78, which is in circuit with steering drive clutch 48, will be closed thereby effecting a right turn correction of the tractor to an "on heading" course.

From the foregoing description, it should be understood that if a vehicle, such as the tractor shown, is headed in a desired direction and the table 80 is then adjusted to neutral position and then locked in place, the tractor can then be started into movement with every assurance that the gyro will effect steering corrections to the selected heading in accordance with conventional practice.

As best described with reference to Fig. 7, the table 80 is manually adjustable to "neutral" position by rotating the table which is fixed for rotation with a shaft 82 mounted upon anti-friction bearing units journalled in the casing 70. The table is locked in position relative to the tractor by manually closing the control circuit as will be described hereinafter. When the control circuit is closed, an electric table brake 84 is energized to prevent rotation of the table shaft 82. The brake 84 is similar to the previously described electric clutches except that the armature 86 thereof is secured against rotation to a plate 88 which is fixedly mounted upon the casing 70. Accordingly, when the field of the brake 84 is energized, thereby locking the armature 86 against rotation relative to the shaft 82, the said shaft and the table 80 are locked against rotation relative to the casing 70.

In further accord with the present invention, and as will be shown in detail hereinafter, the travel sensitive control means is coordinated with the aforedescribed directional control means and in its broadest sense comprises switch means adapted to unlock the table 80 after the tractor has travelled a preselected distance and to permit automatic turning of the table 80 to effect a controlled turn of the tractor to a new heading.

The drive means for automatically turning the table is coordinated with the drive to the travel sensitive control means which is powered from the odometer wheel 26 mentioned at the outset of this description. Therefore, a consideration of the travel sensitive control means and its drive now appears to be in order.

As its name would imply, the odometer wheel 26 is provided to power a drive in response to actual movement of the tractor. In order to attain high fidelity power transmission in response to movement, the wheel 26 is carried by an oleo support or mount 90 which assures slip-proof engagement between the wheel and the ground over which the tractor travels. Accordingly, the odometer wheel 26 will accurately record travel of the tractor and, by means of the drive connections, transmit the recorded travel information or movement of the tractor to the control unit 18 where such information is utilized as will be explained.

The said drive connections comprise motion transmitting means in the form of a chain and sprocket drive 92 interconnecting the odometer wheel 26 and an input shaft 94 to the control unit 18. The said input shaft 94, which is rotated one revolution in response to travel of the tractor over a known lineal distance, will hereinafter be referred to as the control drive shaft.

The control drive shaft 94, as more particularly shown in Fig. 6 extends horizontally and transversely of the housing 70 wherein it is journalled on anti-friction bearing units. The recorded travel information of the control drive shaft is utilized by a pair of control drums 96 and 98 which are mounted by the housing in transversely spaced positions for rotation about vertical axes and each of which has selectively operable drive connections to the control drive shaft 94.

The drive arrangement for drum 96 includes a shaft 100 journalled longitudinally of the housing 70 and to which is fixedly secured a worm gear 102 which is engaged by a worm 104 fixed to the control drive shaft 94. A pair of electric clutches 106 and 108, similar in all respects to the clutches 46 and 48, previously described, are mounted upon the shaft 100 to effect selective driving engagement between the shaft 100 and a pair of bevel gears 110 and 112, respectively. The gears 110 and 112 are engaged in diametrically opposed locations with a bevel gear 114 which is fixed to a vertical shaft 116 upon which the drum 96 is fixed for rotation. It will be readily understood that when clutch 106 is engaged to effect drive through gear 110, the drum 96 and its shaft 116 will be rotated in one direction. When clutch 108 is engaged to effect drive through gear 112, the drum will be rotated in the opposite direction. In either event, the drum will be rotated in direct response and ratio to travel of the tractor. For simplicity of terms, let the rotation of drum 96 when clutch 106 is engaged be called "forward rotation" and when the drum rotates with clutch 108 engaged, let such rotation be called "reverse."

The drum shaft 116, which is journalled on anti-friction bearing units in the housing or casing 70, extends vertically upwardly from the housing and an electrically operable drum brake 118 is mounted on said extension. The brake 118 is similar to brake 84, previously described, and is provided to prevent rotation of drum 96 except when either clutch 106 or clutch 108 is energized. As will be understood in connection with the wiring diagram, either of clutches 106 or 108 or brake 118 can be energized only when the other of said elements are de-energized.

The drive arrangement for drum 98 is shown in Fig. 8 and is similar to the arrangement for drum 96. This arrangement includes a shaft 120 journalled by the housing 70 and to which is fixed a worm gear 122 which is engaged by a worm 124 fixed to the control drive shaft 94. A pair of electric clutches 126 and 128, similar to the previously described clutches, are mounted upon shaft 120 to effect selective driving engagement between the shaft 120 and a pair of bevel gears 130 and 132, respectively. The gears 130 and 132 are engaged in diametrically opposed locations with a bevel gear 134 which is fixed to a vertical shaft 136 upon which the drum 98 is fixedly mounted. When clutch 126 is energized or engaged, let it be understood that drum 98 is rotated in the "forward" direction and when clutch 128 is energized or engaged, let it be understood that drum 98 is rotated in the "reverse" direction.

The drum shaft 136, similarly to drum shaft 116, extends upwardly from the housing 70 and an electric brake 138 (Figs. 5 and 6) is mounted upon said extension to prevent rotation of drum 98 except when clutch 126 or clutch 128 is energized.

The drums 96 and 98 are similarly formed of non-conductive material, preferably plastic, and each drum is used as an electrical contact carrier which will advance a contact in response and in ratio to lineal movement of the tractor when their respective drive connections are engaged. The contacts which the drums carry comprise radially extending appendages formed on conductive bands embracing the drum. Two such bands 140 and 142 are shown for illustration on drum 96, being secured thereto as by set screws, and having contact appendages 144 and 146, respectively. Bands 148 and 150 having contact appendages 152 and 154, respectively, are shown on drum 98.

The said bands are secured to their respective drums with their contact appendages located with reference to the drums so as to effect engagement with other contacts after the drums have been rotated a predetermined amount corresponding to a preselected distance of tractor travel. To accommodate such location of the contact appendages, each drum is provided with peripherally spaced calibrations 156 corresponding to lineal measurements of ground. The contact appendages on drum 96 are located with respect to its calibrations in rotated positions relative to a contact probe 158 so that a contact appendage will engage the probe contact only after the drum has rotated a preselected amount corresponding to a predetermined distance of tractor travel. Upon engagement of a contact appendage, such as the appendage 146, and the probe contact 158, an electrical circuit through said contacts is closed. Accordingly, the drum 96 may be said to rotate to effect closing of a switch having, for example, the contacts 146 and 158. The function of the electrical circuit will be described hereinafter in connection with an explanation of the wiring diagram.

Figure 9:
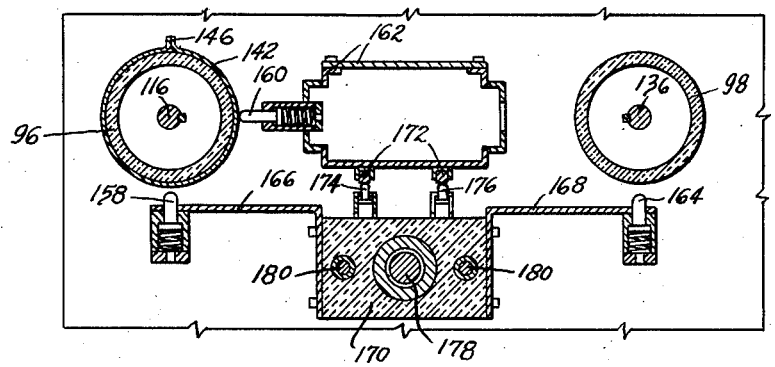
Fig. 9 is a fragmentary horizontal cross-sectional view taken as indicated by line 9—9 of Fig. 6 to show additional details of the travel sensitive control means.

Each of the conductor bands on drums 96 and on drum 98 is energized by a spring biased brush element similar to the brush 160 shown in Fig. 9 which engages band 142. The brush is spring loaded to assure continuous electrical engagement with the band 142 and to permit passage of the contact appendage 146. A plurality of such brushes are vertically adjustably supported in a frame 162 mounted by the housing 70 so that each such brush will engage one of the axially spaced apart bands on the drums 96 and 98. It will be understood that the brushes for drum 98 extend in the opposite direction. It should also be understood that, similarly to drum 96, the bands on drum 98 are angularly adjusted relative to a second contact probe 164.

As shown in Fig. 9, the probe contacts are supported on brackets 166 and 168, respectively, extending from a carriage 170 so as to be engaged only by the respective contact appendages. Each said probe contact is spring biased towards its respective drum and is energized by wiring to a brush which engages one of a pair of conductor bars 172, 172 carried by the frame 162. The brush for probe 158 is indicated by numeral 174 and number 176 indicates the brush for probe 164. The brushes 174 and 176 are mounted upon the carriage 170 for vertical movement along the bars 172, 172.

The carriage 170 is threadably connected to a lead screw 178 and in response to rotation of the lead screw will be shifted vertically since vertical guide rails 180, 180 prevent rotation of the said carriage.

The drive for rotating lead screw 178 is taken from the control drive shaft 94 to which is mounted an electric clutch 182 arranged when energized to engage bevel gear 184 and shaft 94. The gear 184 is engaged with a bevel gear 186 on lead screw 178 and will rotate the lead screw so as to elevate the carriage. Similarly to the drum shafts, the lead screw extends through the housing 70 and has an electric brake 188 mounted thereon to prevent rotation of the lead screw except when clutch 182 is energized. A second clutch 190 is provided to effect driving connection between a bevel gear 192 and control drive shaft 94 and thereby rotate the lead screw in the opposite direction to lower the carriage if it proves desirable to move the carriage in both directions.

As will be shown more in detail hereinafter, it is the function of the lead screw to shift or index the carriage along the drums thereby bringing the respective probes into registry with different bands which are axially spaced along the drums for the purpose of effecting certain control operations.

In this manner, the carriage 170 will be shifted upwardly from the lowermost position shown in Fig. 6 step-by-step into registry with bands spaced along the drums until the selected cycle of operation has been completed at which time the carriage will be elevated to its uppermost position and engage a limit switch 194 which, as will be shown hereinafter, opens the power circuit to stop automatic operation of the tractor.

Also included in the control mechanism for the lead screw 178 is a limit switch 196 which is operated by a limit switch trip arm 198 secured to the top of the lead screw for rotation therewith. As will be shown later, when the limit switch 196 is released, the lead screw brake 188 is deenergized permitting the lead screw to be driven through one or more revolutions during a preselected time delay period thereby to index a probe contact from one conductor band to the next conductor band on its respective drum by movement of the carriage.

As previously mentioned, the drive for the aforedescribed travel sensitive control elements is utilized to drive the table 80 to effect controlled turns of the tractor during a selected course or cycle of operation. The drive for the table 80 is taken from a forwardly extending portion of shaft 100 upon which is mounted a pair of clutches 200 and 202 adapted when selectively energized to effect driving engagement between the shaft 100 and bevel gears 204 and 206, respectively. The gears 204 and 206 are engaged in diametrically opposed locations with a bevel gear 208 fixed to the lower end of the table shaft. In the manner previously described in connection with the other electric clutches, the clutches 200 and 202 are selectively engaged or energized when table brake 84 is deenergized to effect rotation of the table in opposite directions. With reference to Fig. 5, let it be assumed that when clutch 200 is energized, the table 80 rotates clockwise and when clutch 202 is energized the table 80 rotates counterclockwise.

Electrical control operations are automatically brought about during rotation of the table 80 by mounting a plurality of limit switch trips 210, 212, 214, and 216 on the table for engagement with limit switches 218, 220, 222 and 224, respectively, supported on brackets 226, 226 fixed to the housing 79. The said limit switch trips are mounted within vertically spaced peripheral T slots 228 on the table 80, each trip being disposed in one such slot and being adjustable therein for precise location in accordance with radial calibrations 230 provided on the top and periphery of the table. Only one limit switch is carried by each of the brackets 226, 226 circumferentially spaced around the table and each switch is disposed at a different elevation than the others so as to be engageable by only one trip. In accordance with this mounting arrangement, 210 engages switch 218, trip 212 engages switch 220, trip 214 engages switch 222, and trip 216 engages switch 224.

Figure 10:
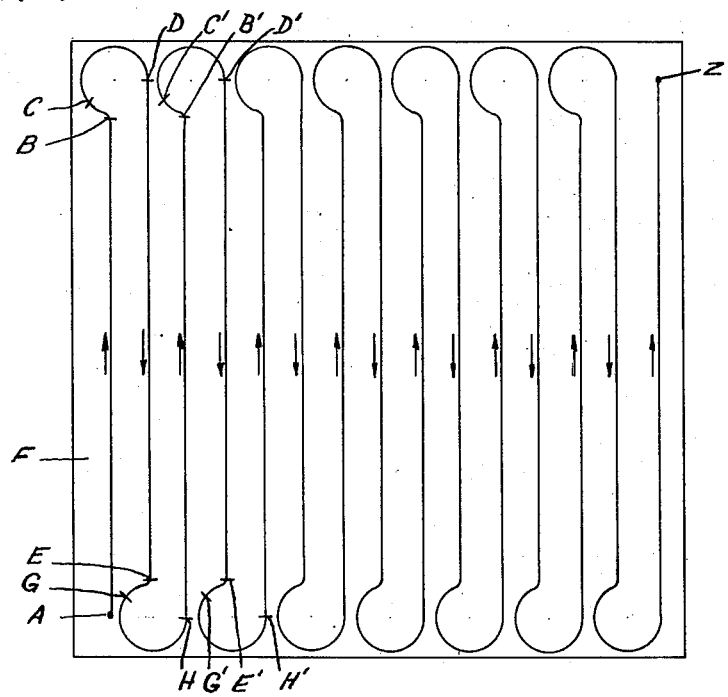
Fig. 10 is a schematic illustration exemplary of a pattern or course of operation over which the tractor may be guided by the pilot mechanism of this invention.

*Operation over the pattern illustrated in Fig. 10*

In order to more readily understand the operation of the automatic pilot mechanism, reference is made to the wiring diagram of Fig. 11 which shows schematically all of the conventional elements such as switches, etc., which have not been described heretofore.

Assume that a farmer wishes to start the tractor upon a course of operation within a field F as shown in Fig. 10, starting from the position A, traversing the field back and forth as shown by the arrows and stopping at the position Z.

Before starting operation, the tractor is positioned at the point A and headed toward the point B at the other end of the field where the tractor should start to turn to accomplish the desired turn or loop as shown. Then the table 80 is adjusted manually until the arrow 232 (Fig. 5) on the table is aligned with a reference point 234 on the housing 70 and the table can then be locked relative to the housing as will be shown. The gyro 72, of course, will soon adjust or neutralize itself to such position of the table and thereafter, deviations of the tractor, and thus the table, will cause the gyro to effect steering corrections. The limit switch trips are then located on the table 80 with reference to the calibrations 230 and the arrow 232. In performance of the pattern shown in Fig. 10, trip 210 is located on the arrow; trip 212, 45° clockwise from the arrow; trip 216, 135° clockwise from the arrow; and trip 214, 180° clockwise from the arrow. This location of the trips, as will be shown hereinafter, effects engagement of the limit switches 218—222, located as shown in Fig. 5, in sequence as the tractor makes turns at the ends of the field and such engagement is coordinated to positions of the tractor at the points C, D, G and H, respectively.

Then the lineal distance between ground points A and B on the field F is accurately measured. This lineal measurement is set up on control drum 96 by manually adjusting the lowermost conductor band (142) thereon until contact appendage 146 is spaced in the "reverse" direction on drum 96 (according to the peripheral calibrations 156) a distance from contact probe 158 corresponding to the measured distance between A and B. The next lowermost conductor band 140 is then adjusted on drum 96 in the "forward" direction until its appendage 144 is separated from appendage 146 a distance corresponding to the lineal measurement between points A and B. The calibrated displacement on drum 96 between appendages 144 and 146 corresponds to the distance between points D and E on the field F, said distance being equal to the measured distance between A and B. The next lowermost conductor band (not shown) is adjusted on drum 96 so that its appendage will be separated from appendage 144 in the "reverse" direction by the same amount to correspond to the distance between points H and B' on the field F.

There will be one conductor band provided on drum 96 for each traverse of the field F, calling for fifteen such bands equally axially spaced apart on the drum to fulfill the course of operation illustrated. As will be shown, during the first traverse, the drum 96 will be rotated in "forward" to close the "reverse" spacing between contact appendage 146 and probe 158, corresponding to tractor travel between points A and B. During the second traverse, the drum will be rotated in "reverse" to close the "forward" spacing between contact appendage 144 and probe contact 158, corresponding to tractor travel between points D and E. The drum 96 will continue to be rotated forwardly and alternately in reverse until the final traverse has been accomplished and the tractor arrives at the stop point Z. Only drum 96 will be operated to pilot the tractor over the pattern illustrated and, therefore, no pre-adjustment to the bands on drum 98 is necessary.

The next step preliminary to operation comprises manually adjusting the position of the carriage 170 on the lead screw 178 to assure that the probe 158 is in radial registry with the lowermost conductor band on drum 96. Such manual adjustment may be effected by rotating the lead screw, using limit switch trip arm 198 as a handle.

The next steps in starting operation are accomplished on a control panel (not shown) which supports most of the wiring, switches, etc., shown in Fig. 11 and which may be mounted at any convenient location on the tractor. In referring more specifically to Fig. 11, it should be understood that the switch elements, etc. are shown in the positions they will assume while the tractor travels from point A toward the point B of Fig. 10.

Since only the one drum 96 is to be used in the illustrative operation, a conventional selector control (not shown) is manipulated to an indicated position thereby closing switches 250, 252, 254 and 255, which effect one drum operation through drum 96 only, and at the same time opening switches 256, 258, 260 and 262 which have to do with operation of drum 98.

At this time, or prior to the last mentioned step, the tractor engine is started with the transmission in neutral.

Then the "Power-On-Off" selector switch 264 is placed in the closed or "on" position completing a circuit from the battery 74 to the gyro 72 which circuit includes the normally and initially closed limit switch 194, which as previously mentioned, is engageable by the carriage 170 at the completion of a cycle of operation to open the power circuit and stop automatic pilot operation.

The next step comprises closing a "Start" switch 266 in the conventional form of a button biased to open position. The said button also closes a normally open switch 268. The switch 266 when closed completes a circuit from the battery 74 through a normally closed switch 270 and a relay 272, thereby energizing the said relay. The relay 272 includes a normally open switch 274 which is closed upon energizing the said relay, the switch 274 being arranged as a shunt around start switch 266, permitting the start switch to open while maintaining closed the circuit to relay 272. Switch 268 when closed completes a circuit from the battery through normally closed switches 360, 276, 278, 280, 282, and 284 and a relay 286, thereby energizing relay 286. Relay 286 includes a normally open switch 288 which is closed upon energizing the relay and which is arranged as a shunt around switch 268 permitting switch 268 to open while maintaining closed the circuit to relay 286.

When relays 272 and 286 are energized as explained above, normally open switches 290 and 282 operated thereby, respectively, are closed to complete a power circuit with drum clutch 106, energizing said clutch to cause drum 96 to rotate in the "forward" direction in response to movement of the tractor as transmitted by the odometer wheel 26. Relay 272 also opens a normally closed switch 293 in the power circuit to drum brake 118, thereby assuring that drum 96 will be free to rotate as described. At the same time, a normally open switch 294 is closed by relay 286 to complete a power circuit with the table brake 84, energizing said brake to prevent rotation of the table 80 relative to the tractor.

The lead screw brake 188 will also be energized to secure the carriage 170 against movement by means including limit switch 196 which is held closed by trip arm 198. The limit switch 196 is included in a power circuit to relay 296 through normally closed switches 298 and 300 thereby causing relay 296 to be energized. When relay 296 is energized, a normally open switch 302 is closed thereby completing the power circuit to the lead screw brake 188, energizing the same to prevent movement of the carriage 170 during rotation of the drum 96.

Having set up the pilot mechanism for automatic operation by placing the power switch in "on" position and by closing or pressing the "Start" button, the tractor clutch can now be engaged to start the tractor in movement from the point A toward the point B. During such movement, the drum 96 is rotated in the "forward" direction, advancing contact appendage 146 toward the probe 158. Such rotation of drum 96 will be counterclockwise as viewed in Fig. 9.

The gyro unit 72, operating in accordance with conventional practice, will exercise direction sensitive control over the tractor to keep it in a substantially straight coarse between points A and B. Gyro control is manifested in the control diagram by closing and opening of servo switches 76 and 78. For example, if the tractor deviates from the straight course toward the right, the gyro unit will close servo switch 76 which energizes the left turn clutch 46 causing the tractor to be turned toward the left until back on course at which time the gyro unit permits switch 76 to open. If the deviation is toward the left, switch 78 will be closed to energize right turn clutch 48 thereby correcting toward the right. In this manner, the tractor traverses the field F from A to B in a substantially straight line and at the same time the drum 96 is rotated to effect movement of contact appendage 146 toward probe 158.

When the tractor has completed the traverse and arrived at point B, the appendage 146 will engage probe 158 in the manner of closing a switch which is indicated on the wiring diagram by reference numeral 304. The switch 304 is connected in a power circuit which includes a normally closed switch 306 and a relay 308. Relay 308 closes a normally open switch 309 arranged as a shunt for switch 304 to assure that relay 308 will remain energized.

Relay 308 when energized also opens normally closed switch 270 in the power circuit to relay 272 whereupon relay 272 is de-energized. When relay 272 is de-energized, normally open switch 292 controlled thereby is permitted to open thus de-energizing drum clutch 106 to stop rotation of the drum 96. Relay 272 when de-energized also permits normally closed switch 293 to close, thereby completing the power circuit to drum brake 118, energizing said brake to assure that drum 96 will not rotate. Relay 308 when energized also opens the normally closed switch 276 in the power circuit to relay 286 whereupon relay 286 is de-energized. When relay 286 is de-energized, normally open switch 294 controlled thereby is permitted to open thus de-energizing table brake 84 to permit rotation of the gyro table 80.

Having arrived at the point B on the field, the preselected pattern for automatic operation of the tractor calls for a looping turn through 180°, the loop to be started by a short left turn to the point C and completed by a sweeping right turn to the point D. In accordance with the present invention, the tractor is automatically controlled in the turns making up the loop.

To direct the tractor first towards the left, the table 80 is rotated toward the right, or clockwise as viewed in Fig. 5, such movement of the table having the effect on the gyro unit of a right turn deviation of the tractor, whereupon the gyro will cause a left turn to take place as in correction of the deviation. When the tractor reaches the point C, the table will be rotated counterclockwise thereby calling for a right turn correction under gyro control until the tractor arrives at the point D. It should be understood that the table 80 should be rotated sufficiently fast to prevent the gyro 72 from catching up to it and becoming "neutral" in a new position of the table.

More specifically, at the point B when the relay 308 has been energized to unlock the table brake, the relay 308 also closes a normally open switch 310 in the power circuit to table clutch 200 thereby energizing said clutch for a clockwise turn of the table as driven by the odometer drive mechanism in response to movement of the tractor. The clockwise movement of table 80 falsely indicates a right turn deviation of the tractor whereupon the gyro unit will close switch 76 in the circuit of left turn clutch 46, causing the tractor to turn to the left towards point C.

The table 80 will continue to turn clockwise as the tractor turns to the left until limit switch trip 210, carried by the table, engages and closes limit switch 218, at which time the tractor will have arrived at point C. Limit switch 218, upon being closed, energizes the power circuit to a relay 312 through a normally closed switch 314 which is controlled by relay 286. Relay 312 closes a normally open shunt switch 313 around switch 218 to keep relay 312 energized.

Relay 312 controls and opens normally closed switch 306 in the power circuit to relay 308, de-energizing said relay whereupon switch 310 in the power circuit to table clockwise clutch 200 is opened, stopping clockwise movement of the table 80. At the same time relay 312 closes a normally open switch 316 in the power circuit to the table counterclockwise clutch 202 whereupon the table is rotated counterclockwise.

It will be noted that the clockwise movement of the table 80 to effect a tractor turn from point B to point C and to effect closing of limit switch 218 by the trip 210, will be of the order of 45°. Then in order to effect the full turn to the point D, the table must be rotated through approximately 225° counterclockwise. This illustrative angular displacement of the table 80 is selected by angularly adjusting the position of the trips 210—216 on the table with reference to the calibrations 230 provided thereon. It will also be noted that initially and during counterclockwise movement of the table 80, the trip 216 engages its limit switch 224 which, as will be shown, normally tends to start drum 96 into "forward" rotation. However, both initially and during the described counterclockwise movement of the table, closing of limit switch 224 is ineffective since a normally closed switch 318 included in the power circuit with switch 224 has been opened by relay 308 at the point B, and a normally closed switch 319 included in circuit with switch 224 is opened by relay 312 at the point C.

The counterclockwise rotation of table 80, instituted as explained when the tractor reaches point C, continues through approximately 225° until trip 212 engages and closes its limit switch 220. This, of course, occurs when the table 80 has been rotated 180° from its initial "neutral" position to a second "neutral" position which coincides with arrival of the tractor at the point D, and at which point the gyro unit 72 "catches up" with the table and again neutralizes itself.

The limit switch 220 when closed energizes the relay 286 which closes normally open shunt switch 288 to maintain relay 286 energized. When relay 286 is energized, it opens the normally closed switch 314 in the circuit to relay 312 which de-energized causing switch 316 in the power circuit to the table counterclockwise clutch 202 to be opened thereby stopping rotation of the table 80. At the same time, relay 286 closes the normally open switch 294 in the circuit with the table brake 84 to engage said brake for assurance against inadvertent table rotation. Also at the same time relay 286 opens a normally closed switch 320 in the power circuit to drum brake 118 so the drum 96 can be driven. And also at the same time, relay 286 closes a normally open switch 322 in the power circuit to a relay 324 which circuit includes the closed selector switch 250 and normally closed switches 326 and 328. When relay 324 is energized, a normally closed switch 330 in the circuit to the drum brake is also opened to assure that drum 96 can be driven.

As shown in Fig. 11, the relay 286 also closes switch 332 and relay 324 closes switch 334, both said switches being normally open in the power circuit to drum clutch 108 which, as explained before, rotates drum 96 in the "reverse" direction. "Reverse" rotation of the drum 96 advances contact appendage 144 on conductor band 140 towards the probe 158 which has been indexed vertically with carriage 170 from registry with band 142 to registry with band 140.

At this point, it should be explained that such indexing movement was instituted at the point B and resulted from closing switch 304 by contact appendage 146 engaging the probe 158. When switch 304 is closed, a power circuit through selector switch 252 is completed to a time delay relay 336 which opens, for the time delay period, the normally closed switch 298 in the power circuit to relay 296. When relay 296 is thus de-energized, the normally open switch 302 in the power circuit to the lead screw brake 186 opens, de-energizing the brake for rotation of the lead screw. Also while relay 296 is de-energized, a normally closed switch 338 is permitted to close in the power circuit to the lead screw clutch 182. At the same time, relay 308, which has been energized by the closing of switch 304, closes a normally open switch 340 to complete the power circuit to the probe clutch 182 whereupon the lead screw 178 will be rotated to elevate the carriage 170 which carries the probe 158. Of course, the carriage is to be elevated only sufficiently to index probe 158 from band 142 to 140. Such limitation on the movement of the carriage is accomplished by the time delay of relay 336 and by the closing of limit switch 196. The relay 336 is selected to have a timing period long enough to permit the limit switch trip arm 198 to move through the selected number of revolutions and to re-engage limit switch 196 and thereby energize the lead screw brake and de-energize the lead screw clutch. By such selection of the relay 336, the cycle of indexing cannot be repeated to cause "double indexing" during the tractor travel from B to C. The drive for indexing the lead screw and carriage is, of course, taken from the travel sensitive drive shaft 94 which is powered by the odometer wheel 26 during movement of the tractor in the turn from point B to point C.

Having arrived at the point D with the drum 96 engaged for "reverse" rotation and with the table 80 locked in a "neutral" position, the tractor is ready to traverse the field to the point E under direction sensitive control of the gyro as previously described.

When the tractor arrives at the point E, the contact appendage 144 will engage the probe 158 in the manner of closing a switch which is indicated by reference numeral 342. The switch 342 thereupon closes the power circuit to a relay 344 through a normally closed switch 346 and relay 344 closes a switch 348 arranged as a shunt for switch 342 to keep relay 344 energized. The relay 344 opens normally closed switch 284 thereby de-energizing relay 286. Relay 286 in turn permits switch 332 to open thereby de-energizing the drum "reverse" clutch 168 to stop rotation of drum 96 and at the same time relay 286 permits switch 320 to close to energize the drum brake 118.

At the time switch 342 energizes relay 344, it also energizes time delay relay 350 through closed selector switch 254. The time delay relay 350, by means of opening switch 300, de-energizes relay 296 which opens switch 302 to de-energize the lead screw brake 188, permitting rotation of the lead screw. Relay 344, at the same time closes a switch 352 which energizes the lead screw drive clutch 182 to rotate the lead screw and thus elevate the carriage and probe. At the end of the time delay period, and when limit switch trip arm 196 again engages and closes limit switch 198, relay 296 will be energized to close switch 302 and thus engage the lead screw brake 188 at the same time opening switch 338 to de-energize the lead screw drive clutch 182.

Also when switch 342 is closed by arrival of the tractor at the point E, de-energizing relay 286 thus permitting switch 294 to open, the table brake 84 is de-energized. At the same time, relay 344 closes a switch 354 which energizes table clutch 202 for counterclockwise movement of the table 80. Such counterclockwise movement falsely indicates a left turn deviation to the gyro unit 72 which institutes a right turn correction to steer the tractor from point E towards point G. When the point G is reached, the trip 214 on table 80 engages and closes limit switch 222.

Limit switch 222 energizes a relay 356 which closes normally open shunt switch 357 around switch 222 to keep relay 356 energized and relay 356 also opens switch 346, thereby de-energizing relay 344. When relay 344 is de-energized, switch 354 opens, de-energizing table clutch 202 to stop counterclockwise rotation of the table 80. At the same time, relay 356 closes a normally open switch 358 which energizes table clutch 200 to start clockwise rotation of the table 80.

Similarly to the loop from B to D, the tractor in travelling from points E to G will do so in response to approximately 45° counterclockwise rotation of the table 80 and the tractor moves from G to H in response to approximately 225° clockwise rotation of the table. Of course, during clockwise rotation of the table between the points G and H, the tractor is turned toward the left under control of the gyro. It may be noted that at the point E and during said clockwise turn, the trip 212 carried by the table 80, will engage its limit switch 220 which would ordinarily cause the drum 96 to commence "reverse" rotation as previously described. However, such closing of limit switch 220 is ineffective because at the point E, a normally closed switch 284, included in circuit with switch 220, is opened by relay 344, and a normally closed switch 360 in series with switch 220 is opened by relay 356 at the point G.

When table 80 has completed 225° of clockwise rotation and the tractor has arrived at point H, the table will be in its initial neutral position and trip 216 carried thereby will engage and close limit switch 224. Limit switch 224 energizes a relay 362 which closes normally open shunt switch 364 around switch 224 to keep relay 362 energized. Relay 362 also opens normally closed switch 366 in the circuit to relay 356 whereupon switch 358 opens to de-energize table clockwise clutch 200 to stop rotation of the table 80. At the same time, relay 362 closes a switch 368 in circuit with the table brake 84 to lock the table against inadvertent rotation relative to the tractor. Also at the same time, relay 362 closes a normally open switch 370 in series with drum clutch 166 while opening a normally closed switch 372 in the circuit of drum brake 118, whereupon the drum starts "forward" rotation as the tractor leaves point H and commences a traverse towards the point B'.

Point H corresponds to the starting point A and the aforedescribed operative cycle is repeated through the points B', C', D', etc. Cycle repetition is continued until the tractor reaches the stopping point Z on the field F. As explained above, at the completion of each traverse, the carriage 170 is elevated to index the probe 158 with the next highest conductor band on the drum 96. Since fifteen traverses are called for in the course of operation plotted in Fig. 10, fifteen such bands should be placed on the drum in equally axially spaced apart locations so that the uppermost band, when engaged by the probe 158 to cause rotation of the lead screw as explained hereinbefore, will cause the carriage to be elevated into engagement with limit switch 194. As shown in Fig. 11, when switch 194 is opened by the carriage, all power circuits are thereby opened and the automatic pilot becomes inoperative. It is anticipated that the limit switch 194 can be advantageously included in the ignition circuit of the tractor also, so that opening of said switch will automatically stop all tractor operation.

Figure 12:
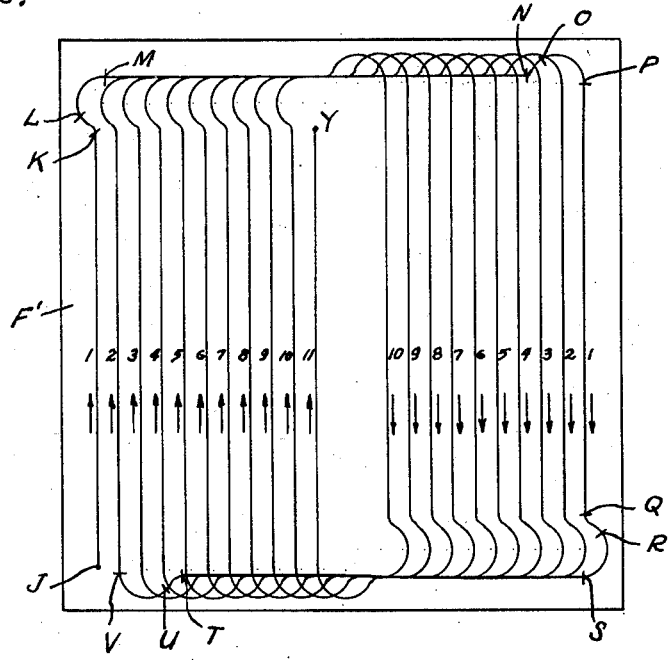
Fig. 12 is a schematic illustration exemplary of an alternative pattern or course of operation over which the tractor may be guided.

As mentioned before, the pilot mechanism can be adapted to automatically control operation of the tractor over various patterns or courses of operation. Fig. 12 is illustrative of an alternative course of operation shown on a field F' and wherein it is desired to start the tractor at the point J and stop at the point Y, after automatically steering the tractor in a generally rectangular pattern through the points K—V, etc.

*Operation over the pattern illustrated in Fig. 12*

Figure 14:
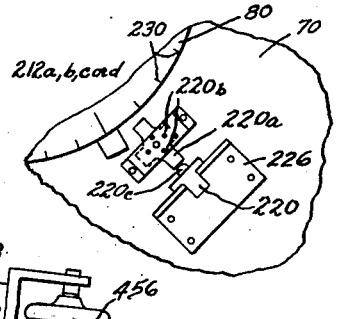
Fig. 14 is a detail view of a table switch.

In preparing the tractor for operation from the point J, much of the preliminary procedure previously described will be duplicated. For example, the operator should be sure that the table 80 is positioned with the arrow 232 in registry with reference point 234. For operation over the course shown in Fig. 12, only limit switches 218 and 220 will be utilized and to effect the desired turns in said course. four trips, 210a, 210b, 210c and 210d, will be used to trip switch 218 and trips 212a, 212b, 212c and 212d will be used to trip switch 220. The trips for this course will be located with reference to the arrow 232 as shown in Fig. 13. For this course of operation, limit switch 220 is altered or modified to close every other time it is engaged by a trip. To effect such selective operation of switch 220, the same is provided with a star wheel actuator 220a (Fig. 14) which in only every other rotated position, as determined by detent means 220b, will engage a contact member 220c thereby closing the said switch.

Then the conductor bands on drum 96 are adjusted as described heretofore, but in this case, the distances to be set up on the drum calibrations in spacing the contact appendages should correspond to the lineal distance between points J and K. The number of bands on drum 96 should correspond to the number of traverses planned (21 in the illustration) which run parallel to the line J—K.

Since drum 98 will also be used in performing this pattern, contact bands, such as the bands 148 and 150 must be arranged on drum 98 similarly to the bands on drum 96 and should be arranged parallel to the bands on drum 96. However, one less band is needed on drum 98 so that the bands on that drum will correspond in axial spacing with the bands on drum 96 from the lowermost band on drum 96 to the next to the top band on drum 96. The contact appendages on the bands on drum 98 are spaced, in accordance with the manner described, from the probe 164 and from each other varying distances. The first spacing (between probe 164 and the contact appendage on the lowermost band) should correspond to the lineal distance between points M and N. The next spacing (between the appendage on the lowermost band) should correspond to the lineal distance between points A and T. It will be noted that the distance S—T is less than the distance M—N by a calculable amount. The spacing between contact appendages should decrease from band to band on drum 98 by an amount corresponding to the calculable lineal distance.

The next step preliminary to operation is to move the carriage 170 to its lowermost position as described.

Turning next to the control panel, the selector switch control is manipulated for two drum operations, thereby closing switches 256, 258, 260 and 262 which bring drum 98 into operation and at the same time opening switches 250, 252, 254 and 255 which are closed for one drum operation only.

At this time, the tractor engine can be started with its clutch disengaged. Then the "Power-On-Off" selector switch 264 is placed in "on" position energizing the gyro unit 72. Thereafter, the start switch 266 is closed and the tractor clutch engaged to start the tractor moving from point J toward point K.

From the point J to the point K and to the point L, the operation of the pilot mechanism is identical, with one exception, to its operation from the point A to the point B, to the point C as described in connection with the pattern shown in Fig. 10. The exception occurs at the point K. At this point, the lead screw is not indexed as previously described because, although relay 308 is energized to close switch 340, the lead screw clutch 182 cannot be energized because switch 255, connected in series therewith, is open.

At the point K, the table 80 starts clockwise rotation which is limited to 45° when trip 210a engages limit switch 218, at which time the tractor is at the point L. As before, when limit switch 218 is closed the table 80 is started in counterclockwise rotation. Counterclockwise rotation is limited to 135° by engagement of trip 212a with the star wheel 220a so as to effect closing of switch 220 as shown in Fig. 11. (When the tractor reaches the next corner N, O, P, the table will be rotated in the same manner, namely 45° clockwise then 135° counterclockwise. It will be noted that during the last mentioned counterclockwise movement, the trip 212a will again engage the star wheel 220a, but movement of the star wheel will then be ineffective and switch 220 will not be closed.)

As previously explained, closing limit switch 220 energizes relay 286. At this point, the following described operations occur as a result of energizing relay 286 at the point M.

The relay 286 opens switch 314 in the circuit to relay 312 which thereupon permits switch 316 to open the circuit to table clutch 202 to stop rotation of the table. At the same time, relay 286 closes switch 294 to energize the table brake 84. Also at the same time, a normally closed switch 374 in series with drum brake 138 is opened thereby permitting rotation of drum 98. (The said drum brake was energized initially by closing selector switches 256 and 262.) A normally open switch 376 is closed in the circuit to drum clutch 126 which will rotate drum 98 in its "forward" direction. It should be explained here that normally open switch 378 in series with switch 376 had been closed by relay 380 which was energized by switch 382 being closed by relay 308 at the time the tractor arrived at the point K. The relay 380 remained energized as the tractor moved from point K, because said relay closed a switch 384 which shunts switch 382.

Leaving the point M for the point N, the tractor will be under direction sensitive control of the gyro unit 72 with drum 98 rotating in its "forward" direction. When the tractor reaches the point N, the contact appendage on the lowermost band on drum 98 will engage probe 164. This is indicated in Fig. 11 by the closing of switch 386. Switch 386, through a normally closed switch 388, completes a circuit to energize a relay 390. Relay 390 closes shunt switch 391, and at the same time opens normally closed switch 393 to de-energize relay 380, and also opens normally closed switch 278 thereby de-energizing relay 286 whereupon switch 376 opens de-energizing drum clutch 126 to stop drum 98 from rotating and switch 374 is permitted to close, energizing the brake 138 which locks the drum 98.

At the same time, switch 386 closes a circuit to time delay relay 336 which opens switch 298 thereby de-energizing relay 296 for the time delay period. While relay 296 is de-energized, switch 302 is opened to de-energize the lead screw brake 188 for the time delay period. At the same time, switch 386 closes a switch 392 which is in circuit with switch 338 (closed for the time delay period) and lead screw clutch 182 whereupon the lead screw 178 rotates to elevate carriage 170 and index the probes 158 and 164 with the next lowermost set of conductor bands on the drums 96 and 98.

Also at the point N, relay 390 opens switch 278 thereby de-energizing relay 286 and thus opening switch 294 to de-energize the table brake 84 whereupon the table 80 can be rotated. At the same time, relay 390 closes a switch 394 which energizes the table clutch 200 to rotate the table 80 clockwise. Clockwise rotation of the table ceases after approximately 45° of turn or when the tractor reaches point O in a left turn, and then reverses direction through approximately 135° while the tractor travels to point P in a right turn. Directional control is exercised as explained before by the gyro, the limit switch 218 being actuated by the table trip 210b at the point O and limit switch 220 being closed by trip 212b at the point P.

At the point O, switch 218 energizes relay 312 which opens switch 388, de-energizing relay 390 whereupon switch 278 is permitted to close so that relay 286 can be energized when limit switch 220 is closed at the point P. Relay 286 closes switch 294 to energize the table brake 84 and opens switch 314 thereby de-energizing relay 312 whereupon switch 316 opens to de-energize the table clutch 202. Relay 286 also closes switch 336 which is in series with switch 334 in the circuit to drum clutch 108 which will rotate drum 96 in the "reverse" direction. (It should be noted that switch 334 was closed at the point N when relay 390 closed a switch 396 which energized relay 324 to close switch 334. Switch 334 remained closed, because relay 324 also closed a shunt switch 398 in its power circuit.)

Accordingly, at the point P the table is locked and drum 96 rotate in reverse. Therefore, the tractor will traverse the field to the point Q under direction sensitive control.

At the point Q, the contact appendage on the second lowermost band on drum 96 will engage the probe 158 in the manner of closing a switch 400 shown in Fig. 11. This switch is connected in series with a switch 402, which was permitted to close when relay 312 was de-energized at the point P, and a relay 404 which is thus energized to close a shunt switch 406 about the switch 400 so that the said relay 404 will remain energized. Relay 404 also closes a switch 408 connected in series with a normally closed switch 410 to energize a relay 412. Relay 412 closes a shunt switch 413 to remain energized and at the same time opens a switch 416 in circuit with the brake 138 for drum 98.

At the same time, relay 404 opens switch 280 to de-energize relay 286 whereupon switch 332 is permitted to open thereby de-energizing the drum clutch 108 to stop reverse rotation of drum 96. When relay 286 is de-energized, switch 320 closes to energize brake 118 to prevent inadvertent rotation of drum 96. Relay 286 also permits switch 294 to open to de-energize the table brake 84. Relay 404, at the same time, closes a switch 414 to energize table clutch 200 for clockwise rotation of the table 80. As before, clockwise rotation of the table is limited to approximately 45° by trip 210c closing table limit switch 218 at the point R. Then counterclockwise rotation of the table is effected, as before, through approximately 135° while the tractor turns right to the point S, at which time, table limit switch 220 will be closed by trip 212c. As previously described, closing of switch 220 locks the table 80.

Also at the point S and coincident with the closing of switch 220, relay 286 opens switch 374 to de-energize brake 138 to permit rotation of drum 98 and at the same time, relay 286 closes switch 418 in circuit with drum clutch 128. Said circuit also includes switch 420 which was closed by relay 412, when the tractor reached point Q. With clutch 128 energized, the drum 98 will be rotated in the "reverse" direction as the tractor crosses the field from point S to point T.

When the tractor arrives at the point T, a contact appendage on the drum 98 will have closed in the "reverse" direction upon the probe 164 to effect closing of a switch indicated by reference numeral 422 in Fig. 11. Switch 422 is connected in series with a normally closed switch 424 and a relay 426 which becomes energized upon closing switch 422 to close a shunt switch 428 around switch 422 and remain energized.

Relay 426 opens switch 282 to de-energize relay 286 whereupon switch 418 opens to de-energize clutch 128 and stop rotation of the drum 98. Relay 286, when de-energized, permits switch 374 to close to energize brake 138 and thereby prevent inadvertent rotation of drum 98. At the same time, switch 416, operated by relay 426, de-energizes relay 412 whereupon switch 416 will be closed in circuit with drum brake 138 and switch 420 will be open in circuit with the drum "reverse" clutch 128. Relay 286 also permits switch 294 to open to release the table brake 84 while relay 426 closes switch 430 to energize clutch 200 for clockwise rotation of the table 80.

Switch 422 also completes a circuit to time delay relay 350 which, as described before, releases the lead screw brake 188 while relay 426 closes a switch 429 to energize the lead screw clutch 182 to elevate the carriage 170 to the next lowermost bands on the drums 96 and 98 while the tractor travels from point T to point U.

Such travel of the tractor is occasioned by clockwise rotation of the table through approximately 45° when trip 210d closes limit switch 218 to start counterclockwise rotation of table 80 through approximately 135° at which time trip 212d closes limit switch 220 to stop rotation of the table coincident with arrival of the tractor at the point V.

At the point V, coincident with closing of switch 220, relay 286 is energized to open switch 320 de-energizing the brake 118 to drum 96. At the same time relay 286 closes switch 290 in circuit with the drum "forward" clutch 106. In said circuit is the normally open switch 292 which was closed at the point T by relay 272 which was energized by the closing of switch 432 by relay 426.

Accordingly, at the point V, the table 80 does not rotate and the drum 96 is ready for rotation so the tractor is set, as it was at the point J, for another cycle of operation as described. Such operative cycles will be repeated until the tractor arrives at the point Y, at which time the carriage 170 will engage and open limit switch 194 to stop operation of the automatic pilot mechanism.

*Summary of operation*

The aforedescribed operation of the pilot mechanism over two exemplary courses or patterns as shown in Figs. 10 and 12 can be summarized for greater understanding.

Starting from the point A in Fig. 10, the tractor is piloted in a substantially straight line toward the point B by direction sensitive control means including the gyro unit. During such movement of the tractor, travel sensitive control means including an odometer drive arrangement rotates a control drum in one direction to close switch contacts when the tractor arrives at the point B. As a result of such switch closing at the point B, the drum stops rotating and the gyro table is rotated to falsely indicate directional deviation to the gyro unit whereupon the gyro unit will effect a controlled turn of the tractor through 180°. At the completion of said 180° turn the table will close switch means effective to stop rotation of the table and to initiate rotation of the control drum in the direction opposite to its initial rotation. The position of the tractor at the time said switch means is closed is indicated at the point D. The tractor will then be controlled by the direction sensitive gyro unit to traverse the field in a substantially straight line to the point E. At the point E, the control drum will close switch means effective to stop drum rotation and to institute table rotation such that the tractor will turn 180° oppositely to its first turn. At the completion of the 180° turn, the table will close additional switch means to stop rotation of the table and condition the drum for rotation in the first mentioned direction. Thereafter, the foregoing cycle of operation is repeated until the course of operation has been completed and switch means opened to stop automatic pilot operation.

Starting from the point J in Fig. 12, the tractor advances upon the point K under direction sensitive control of the gyro unit while a first drum is rotated forwardly by the odometer drive to close a first switch when the tractor reaches the designated point K. When the first switch closes, the drum is braked and the table set into rotation to cause the gyro to effect the desired 90° turn. When the turn has been completed, means on the table closes a second switch which brakes the table and starts a second drum into forward rotation while the tractor crosses the field under direction sensitive control to the point N.

At the point N, the second drum closes a third switch to brake the drum and institute table roration for the second 90° turn to the point P.

At the point P a fourth switch, which is table actuated, institutes reverse rotation of the first drum and brakes the table so that the tractor traverses the field under direction sensitive control to the point Q.

At Q, the first drum closes a fifth switch which brakes the first drum and institutes table rotation for the third 90° turn to the point S.

At S, a sixth switch is table actuated to closed position to brake the table and commence reverse rotation of the second drum as the tractor travels under direction sensitive control to the point T.

At the point T, the second drum closes a seventh switch to brake the drum and institute table rotation for the fourth 90° turn to the point V.

At point V, an eighth switch is closed by table actuation to brake the table and institute forward rotation of the first drum, whereupon the described cycle of operation will be repeated.

From the foregoing it should be understood that the tractor can be automatically piloted over a wide variety of patterns by changing the location of the table actuated limit switches and by changing the position of the contacts which are carried by the drums and which are closed as a result of tractor travel over pre-determined distances.

It should also be understood that basically, the pilot mechanism is both direction sensitive and travel sensitive. The direction sensitive control means (the gyro) is utilized to keep the tractor in straight line operation where desired and to turn the tractor where desired as a result of falsifying a deviation by means of an odometer drive arrangement. The odometer drive is also utilized to give truly travel sensitive control to the drums such that control switches may be closed by the drums at preselected locations of the tractor as measured by rotation of the drums which are driven in reference to movement of the tractor.

In addition, it should be understood that alternative forms of structure can be used within the scope of the invention to adapt the pilot mechanism for particular installations. For example, if the pilot mechanism were to be used to control a ship, the odometer wheel shown may be replaced by a water wheel such as will record travel of the ship. Or, the odometer drive may be taken from the screw shaft of the ship.

As another example, the pilot mechanism may be used in aeronautical installations wherein it may be expedient to replace the odometer wheel with a wheel driven by an airstream taken from a pilot tube.

Figure 15:
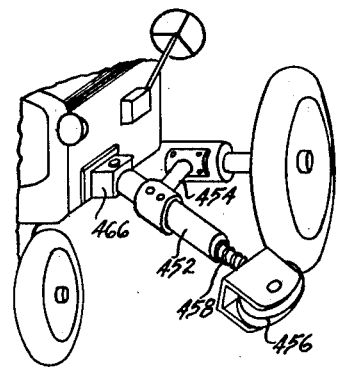
Fig. 15 is a fragmentary perspective view of a tractor guided by pilot mechanism which includes supplementary direction sensitive control means.
Figure 16:
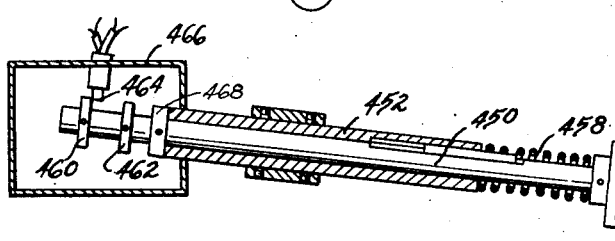
Fig. 16 is a cross-sectional view through the guide arm included in the supplementary direction sensitive control means.

Many other variations and alternative forms of structure may be effected in the mechanism. One alternative arrangement relating to the direction sensitive control means is shown in Figs. 15 and 16. This arrangement may be particularly advantageous in agricultural installations wherein one row or furrow has been plowed and it is desired that the tractor be automatically piloted parallel to such furrow and at a selected distance therefrom.

The pilot mechanism is particularly adapted for such purpose by providing an arm 450 which is telescopically received within a sleeve 452 supported on the left side of the tractor as shown in Fig. 15 by an arm 454 secured to the rear axle housing. The arm 450 extends laterally and downwardly from the tractor and at its outer end rotatably supports a follower wheel 456 which will engage the turf adjacent or within the turned row or furrow. A spring 458 is utilized to bias the arm 450 outwardly from the sleeve 452 so that the follower wheel 456 will resiliently engage the said turf.

On the inner end of the arm 450 a pair of axially spaced rings 460 and 462 are fixed to selectively engage a switch actuator 464 supported within a housing 466 on the side of the tractor.

It will be quite apparent from Fig. 16 that when the arm 450 is extended to its outermost position, whereupon a stop ring 468 engages the inner end of the sleeve 452, ring 460 will engage and move switch actuator 464. This, of course, occurs when the tractor is too far away from the guide row or furrow.

When the tractor gets too close to the guide row, the arm 450 will be forced into the sleeve 452 whereupon ring 462 will engage and move the switch actuator 464. When the tractor is the proper distance from the guide row, neither ring 460 nor ring 462 will engage the actuator 464 and said actuator will be biased to a neutral position.

Accordingly, when switch actuator 464 is engaged by ring 460 as a result of the tractor being too far from the guide row, a left turn of the tractor (in the illustrative example shown) is needed to bring the tractor into proper relationship with the guide row. When the tractor is too close and ring 462 engages the switch actuator 464, a right turn of the tractor is needed to effect correction.

In further accord with the present invention, movement of the said switch actuator may be utilized to effect steering corrections. As shown by the broken lines in Fig. 11, a steering control circuit responsive to movement of the arm 450 can be used to guide the tractor in traverse of a field when the tractor is performing a rectangular pattern such as shown in Fig. 12. The furrow follower shown is thus adapted to operate only when drum 96 is rotating forwardly, as during movement of the tractor from point J to point K, or while drum 96 rotates rearwardly, as during movement from P to Q.

More specifically, a switch 470 is connected in series with normally open switches 472 and 474 and left hand turn clutch 46. Switch 472 will be closed by relay 286 when drum 96 is conditioned for rotation either in the "forward" direction or in "reverse." Switch 474 will be closed by relay 272 when drum 96 is rotated forwardly. A third normally open switch 476 is arranged as a shunt to switch 474 and will be closed by relay 324 when drum 96 is rotated in "reverse." Therefore, if switch 470 is closed by actuator 464 when the tractor is too far from the guide row, clutch 46 will be energized through switch 474 if drum 96 is rotating in the "forward" direction, or through switch 476 if drum 96 is rotated in "reverse" to effect a left turn steering correction of the tractor. When the arm 450 is to be used, normally closed switches 478 and 480 operable by relays 272 and 324, respectively, will be included in the previously described power circuit to clutch 46 to surrender direction sensitive control from the gyro to the arm 450 during rotation of drum 96.

A switch 482, similar to switch 470, is provided in a similar circuit arrangement with the right hand turn clutch 48 so that if switch 482 is closed by actuator 464 when the tractor gets too close to the guide row, a circuit will be closed to the clutch 48 through normally open switch 484 and either of normally open switches 486 or 488 depending upon whether drum 96 is rotating in "forward" or in "reverse" respectively. The switch 484 is operated by relay 286 and switches 486 and 488 are operated by relays 272 and 324, respectively. Relays 272 and 324 also open normally closed switches 490 and 492, respectively, which must be included in the previously described circuit to clutch 48 in order to surrender direction sensitive steering control from the gyro to the arm 450.

As previously mentioned, the arm 450 exercizes direction sensitive steering control in the rectangular pattern only during rotation of the drum 96. The gyro is still used to effect the controlled turns of the tractor when the drum 96 ceases to rotate thereby rendering switches 470 and 482 ineffective.

It will be apparent that such direction sensitive means can be used in the pattern of Fig. 10 too if an additional arm is provided to extend from the other side of the tractor and if said arm is arranged to actuate the switches 470 and 482 or similarly arranged switches in the manner described in connection with the operation of arm 450 and the actuator 464.

Since various other modifications and alterations of the pilot mechanism described herein can apparently be brought about within the scope of the invention, it is not intended that the invention be limited to the specifically described mechanism otherwise than indicated by the claims which follow.

I claim as my invention:

1. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and servo means actuated thereby, said servo means being adapted to selectively energize the drive means for right and left turns in response to deviations of the vehicle from a preselected heading, support means rotatably mounting said gyroscope on the vehicle, drive means including motion transmitting means responsive to movement of the vehicle, electrically operable means for interconnecting said support means and said motion transmitting means to rotate said support means and thereby cause the vehicle to turn in one direction, conductor means interconnecting said source and said electrically operable means, a travel sensitive control unit including switch means operatively connected to said motion transmitting means and adapted to be closed in response to movement of the vehicle over a preselected distance, and means operated by said switch means adapted to energize said electrically operable means and thereby interconnect said motion transmitting means and said support means when said switch means is closed.

2. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means connecting said source and said servo switches, respectively, to said drive means whereby said servo switches are adapted to selectively energize said drive means for right and left turns in response to deviations of the vehicle from a preselected heading, support means rotatably mounting said direction sensitive control unit on the vehicle, drive means including motion transmitting means responsive to movement of the vehicle, electrically operable clutch means adapted to interconnect said motion transmitting means and said support means to rotate said support means and thereby cause the vehicle to turn in one direction, conductor means interconnecting said source and said clutch means, a travel sensitive control unit including switch means operatively connected to said motion transmitting means and adapted to be closed in response to movement of the vehicle over a preselected distance, and means operable by said switch means for energizing said clutch means when said switch means is closed.

3. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means connecting said source and said servo switches, respectively, to said drive means whereby said servo switches are adapted to selectively energize said drive means for right and left turns in response to deviations of the vehicle from a preselected heading, a table supporting said gyroscope and rotatably mounted on the vehicle, drive means including motion transmitting means responsive to movement of the vehicle, electrically operable clutch means adapted to interconnect said motion transmitting means and said table to rotate said table and thereby cause the vehicle to turn in one direction, condutcor means interconnecting said source and said clutch means, a travel sensitive control unit including switch means operatively connected to said motion transmitting means and adapted to be closed in response to movement of the vehicle over a preselected distance, and electrically operable means for energizing said clutch means when said switch means is closed.

4. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means connecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including motion transmitting means responsive to movement of the vehicle, electrically operable clutch means adapted to interconnect said motion transmitting means and said table to rotate said table and thereby cause the vehicle to turn in one direction, conductor means interconnecting said source and said clutch means, a travel sensitive control unit including a drum rotatably mounted on the vehicle and operatively connected to said motion transmitting means, a first switch contact supported adjacent said drum, a second switch contact adjustably supported on said drum for engagement with said first contact during rotation of the drum whereby said contacts are closed in response to movement of the vehicle over a preselected distance, and electrically operable means for energizing said clutch means when said contacts are closed.

5. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means connecting said source and said servo switches, respectively, to said drive means whereby said servo switches are adapted to selectively energize said drive means for right and left turns inresponse to deviations of the vehicle from a preselected heading, a table rotatably mounted on the vehicle and supporting said gyroscope, drive means including a drive wheel rotatably supported by the vehicle in engagement with the ground and also including motion transmitting means connected to said drive wheel, electrically operable clutch means adapted to interconnect said motion transmitting means and said table to rotate said table and thereby cause the vehicle to turn in one direction, conductor means interconnecting said source and said clutch means, a travel sensitive control unit including switch means operatively connected to said motion transmitting means and adapted to be closed in response to movement of the vehicle over a preselected distance, and means operable by said switch means for energizing said clutch means when said switch means is closed.

6. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means connecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including a drive wheel rotatably supported by the vehicle in engagement with the ground and also including motion transmitting means connected to said drive wheel, electrically operable clutch means adapted to interconnect said motion transmitting means and said table to rotate said table and thereby cause the vehicle to turn in one direction, conductor means interconnecting said source and said clutch means, a travel sensitive control unit including a drum rotatably mounted on the vehicle and operatively connected to said motion transmitting means, a first switch contact supported adjacent said drum, a second switch contact adjustably supported on said drum for engagement with said first switch contact during rotation of the drum whereby said contacts are closed in response to movement of the vehicle over a preselected distance, and electrically operable means for energizing said clutch means when said contacts are closed.

7. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means interconnecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including motion transmitting means responsive to movement of the vehicle, a first electric clutch adapted when energized to interconnect said table and said motion transmitting means and rotate the table in one direction and thereby cause the vehicle to turn in one direction, a second electric clutch adapted when energized to interconnect said table and said motion transmitting means and rotate the table in the opposite direction and thereby cause the vehicle to turn in the opposite direction, conductor means interconnecting said first and second clutches, respectively, to said source, a travel sensitive control unit including switch means operatively connected to said motion transmitting means and adapted to be closed thereby in response to movement of the vehicle over a preselected distance, means operable by said switch means for energizing said first clutch when said switch means is closed, a limit switch adapted to be closed in one rotated position of said table, and means operable by said limit switch for energizing said second clutch.

8. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means interconnecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including motion transmitting means responsive to movement of the vehicle, electrically operable table clutch means adapted when energized to interconnect said motion transmitting means and said table to rotate the table and thereby cause the vehicle to turn in one direction, conductor means interconnecting said clutch means and said source, a travel sensitive control unit including a drum rotatably mounted on the vehicle, a first electrically operable drum clutch adapted when energized to interconnect said motion transmitting means and said drum thereby to rotate the drum in one direction, a second electrically operable drum clutch adapted when energized to interconnect said motion transmitting means and said drum thereby to rotate the drum in the opposite direction, conductor means interconnecting said first and second drum clutches, respectively, to said source, a first switch contact supported adjacent said drum, a second switch contact adjustably supported on said drum for engagement with said first contact during rotation of said drum in said one direction, electrically operable means for energizing said table clutch means when said contacts are closed, switch means for energizing said first drum clutch, a limit switch adapted to be closed in one rotated position of said table, and means operable by said limit switch for deenergizing said table clutch means and for energizing said second drum clutch.

9. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means interconnecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including motion transmitting means responsive to movement of the vehicle, a first electrically operable table clutch adapted when energized to interconnect said motion transmitting means and said table thereby to rotate the table in one direction and cause the vehicle to turn in one direction, a second electrically operable table clutch adapted when energized to interconnect said motion transmitting means and said table thereby to rotate the table in the opposite direction and cause the vehicle to turn in the opposite direction, conductor means interconnecting said first and second table clutches, respectively, to said source, a travel sensitive control unit including a drum rotatably mounted on the vehicle, a first electrically operable drum clutch adapted when energized to interconnect said motion transmitting means and said drum to rotate said drum in one direction, a second electrically operable drum clutch adapted when energized to interconnect said motion transmitting means and said drum to rotate said drum in the opposite direction, conductor means interconnecting said first and second drum clutches, respectively, to said source, a first switch contact supported adjacent said drum, a second switch contact adjustably supported on said drum for engagement with said first contact during rotation of the drum in said one direction, electrically operable means for energizing said first table clutch when said switch contacts are closed, manually operable switch means for energizing said first drum clutch, a first limit switch adapted to be closed in one rotated position of said table, means operable by said first limit switch for energizing said second table clutch and for de-energizing said first table clutch, a second limit switch adapted to be closed in another rotated position of said table, and means operable by said second limit switch for de-energizing said second table clutch and for energizing said second drum clutch.

10. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a pair of servo switches actuated thereby, conductor means interconnecting said source and said servo switches, respectively, to said drive means whereby said servo switches are adapted to selectively energize said drive means for right and left turns in response to deviations of the vehicle from a preselected heading, a table rotatably mounted on the vehicle and supporting said gyroscope, drive means including motion transmitting means responsive to movement of the vehicle, a first electrically operable table clutch adapted when energized to interconnect said motion transmitting means and said table thereby to rotate the table in one direction and cause the vehicle to turn in one direction, a second electrically operable table clutch adapted when energized to interconnect said motion transmitting means and said table thereby to rotate the table in the opposite direction and cause the vehicle to turn in the opposite direction, conductor means interconnecting said first and second table clutches, respectively, to said source, a travel sensitive control unit including a drum rotatably mounted on the vehicle, a first electrically operable drum clutch adapted when energized to interconnect said motion transmitting means and said drum to rotate said drum in one direction, a second electrically operable drum clutch adapted when energized to interconnect said motion transmitting means and said drum to rotate said drum in the opposite direction, conductor means interconnecting said first and second drum clutches, respectively, to said source, a pair of switch contacts supported on said drum in axially spaced relationship, a lead screw rotatably supported by the vehicle adjacent and parallel to said drum, electrically operable connecting means for interconnecting said lead screw and said motion transmitting means, conductor means interconnecting said source and said connecting means, a switch contact supported on said lead screw for engagement by one of said pair of switch contacts during rotation of said drum in said one direction and for movement along said lead screw when said lead screw is rotated, electrically operable means for energizing said first table clutch and for de-energizing said drum clutches when said one of said pair of contacts engages said switch contact, manually operable switch means for energizing said first drum clutch, a first limit switch adapted to be closed in one rotated position of said table, means operable by said first limit switch for energizing said second drum clutch and for de-energizing said table clutches, switch means adapted to be closed during rotation of said table to energize said connecting means and shift said switch contact along said lead screw to a position wherein said switch contact is engageable by the other of said pair of contacts during rotation of said drum in said opposite direction, electrically operable means for energizing said second table clutch and for de-energizing said drum clutches when said other of said pair of contacts engages said switch contact, a second limit switch adapted to be closed in another rotated position of said table, and means operable by said second limit switch for energizing said first drum clutch and for de-energizing said table clutch.

11. An automatic pilot for a self-propelled vehicle comprising in combination, a source of electrical energy, drive means connected to the steering apparatus of the vehicle and selectively operable to turn the vehicle in either direction, a direction sensitive control unit electrically connected to said source and including a gyroscope and servo means actuated thereby, said servo means being adapted to control said drive means, a table rotatably mounting said gyroscope on the vehicle, drive means responsive to movement of the vehicle and including motion transmitting means, electrically operable table clutch means for interconnecting said motion transmitting means and said table for rotation thereof, a travel sensitive control unit electrically connected to said source and including first and second switch means, electrically operable means for selectively connecting said first and second switch means to said motion transmitting means, means operable by closing either of said first or second switch means for energizing said table clutch means, a limit switch adapted to be closed in one rotated position of said table, and means operable by said limit switch for energizing said electrically operable means, whereby said first and second switch means close in sequence interspersed by rotation of said table.

12. An automatic pilot for a self-propelled vehicle comprising in combination, a source of electrical energy, drive means connected to the steering apparatus of the vehicle and selectively operable to turn the vehicle in either direction, a direction sensitive control unit electrically connected to said source and including a gyroscope and servo means actuated thereby, said servo means being adapted to control operation of said drive means, drive means including motion transmitting means responsive to movement of the vehicle, an electrically operable table clutch adapted when energized to connect said motion transmitting means and said table to rotate said table, a travel sensitive control unit electrically connected to said source and including first and second switch means each of which is adapted when closed to energize said table clutch, electrically operable means for selectively connecting said first and second switch means to said motion transmitting means, a manually operable switch for energizing said electrically operable means to connect said first switch means to said motion transmitting means, and a plurality of limit switches arranged for sequential operation in rotated positions of said table and adapted to energize said electrically operable means for sequential connection of said first and second switch means to said motion transmitting means, said connection of said first and second switch means being interspersed by rotation of said table.

13. Automatic pilot mechanism as defined in claim 12 wherein each of said first and second switch means comprises a drum rotatably mounted on the vehicle, a first switch contact supported adjacent said drum, a second switch contact adjustably supported on said drum for engagement with said first contact, and wherein said electrically operable means comprises a clutch for each said drum adapted when energized to rotate the said drum, whereby the said first and second switch means are closed in response to movement of the vehicle over preselected distances.

14. In automatic pilot mechanism of the type including a gyroscope adapted to actuate servo means and thereby effect steering control of a self-propelled vehicle, the improvements comprising a table rotatably mounted on the vehicle and supporting the gyroscope, drive means including motion transmitting means responsive to movement of the vehicle, and means interconnecting said motion transmitting means and said table to rotate the table during movement of the vehicle and thereby effect a controlled turn of the vehicle.

15. In automatic pilot mechanism of the type including a source of electrical energy and a gyroscope operatively connected thereto and adapted to actuate servo means and thereby effect steering control of a self-propelled vehicle, the improvements comprising a table rotatably mounted on the vehicle and supporting the gyroscope, drive means including motion transmitting means responsive to movement of the vehicle, electrically operable means adapted to interconnect said motion transmitting means and said table to effect rotation of said table, conductor means interconnecting said electrically operable means and the source of electrical energy, and switch means electrically connected to said conductor means and operatively connected to said motion transmitting means and adapted when closed to energize said electrically operable means.

16. In automatic pilot mechanism of the type including a source of electrical energy and a gyroscope operatively connected thereto and adapted to actuate servo means and thereby effect steering control of a self-propelled vehicle, the improvements comprising a table rotatably mounted on the vehicle and supporting the gyroscope, drive means including motion transmitting means responsive to movement of the vehicle, electrically operable means adapted to selectively interconnect said motion transmitting means and said table to effect rotation of the table in either direction, conductor means interconnecting said electrically operable means and the source of electrical energy, switch means electrically connected to said conductor means and operatively connected to said motion transmitting means and adapted when closed to energize said electrically operable means and thereby rotate the table in one direction, and a limit switch electrically connected to said conductor means and operatively connected to said table so as to close in one rotated position thereof, said limit switch being adapted when closed to energize said electrically operable means and thereby rotate said table in the opposite direction.

17. In automatic pilot mechanism of the type including a source of electrical energy and a gyroscope operatively connected thereto and adapted to actuate servo means and thereby effect steering control of a self-propelled vehicle, the improvements comprising, a table rotatably mounted on the vehicle and supporting the gyroscope, drive means including motion transmitting means responsive to movement of the vehicle, a first electrically operable clutch adapted to interconnect said tables and said motion transmitting means to rotate the table in one direction, a second electrically operable clutch adapted to interconnect said table and said motion transmitting means to rotate the table in the opposite direction, conductor means electrically connecting said first and second clutches, respectively, to the source of electrical energy, switch means electrically connected to said conductor means and operatively connected to said motion transmitting means and adapted when closed to energize said first clutch, and a limit switch electrically connected to said table so as to close in one rotated position thereof, said limit switch being adapted when closed to energize said second clutch.

18. An automatic pilot for self-propelled vehicles comprising in combination, a source of electrical energy, electrically operable drive means operatively connected to the steering apparatus of the vehicle and adapted to selectively turn the vehicle in either direction, conductor means interconnecting said source and said drive means, a first pair of servo switches connected, respectively, to said conductor means for selectively energizing said drive means, support means secured to the vehicle and extending outwardly therefrom, a switch actuating arm movably mounted on said support means for engagement with a guide furrow on the ground, said arm being adapted to selectively close said first pair of servo switches and thereby steer the vehicle with reference to the guide furrow, a turn control unit including a gyroscope connected to said source and a second pair of servo switches arranged in parallel to the first pair of switches and adapted for actuation by said gyroscope, drive means including motion transmitting means responsive to movement of the vehicle, a table rotatably mounted on the vehicle and supporting said gyroscope, electrically operable clutch means electrically connected to said source and adapted when energized to interconnect said motion transmitting means and said table, and switch means electrically connected to said source and operatively connected to said motion transmitting means, said switch means being adapted when closed to electrically disconnect said first pair of servo switches while electrically connecting said second pair of servo switches and to energize said clutch.

References Cited in the file of this patent

UNITED STATES PATENTS

| Number | Name | Date |
|---|---|---|
| 694,791 | Sack | Mar. 4, 1902 |
| 1,355,152 | Laird | Oct. 12, 1920 |
| 1,459,946 | Camarata | June 26, 1923 |
| 1,570,547 | Avera | Jan. 19, 1926 |
| 2,311,321 | Zigan | Feb. 16, 1943 |
| 2,317,400 | Paulus et al. | Apr. 27, 1943 |
| 2,331,144 | Sitter | Oct. 5, 1943 |
| 2,496,727 | Jenkins | Feb. 7, 1950 |
| 2,509,914 | Goodwine | May 30, 1950 |

FOREIGN PATENTS

| Number | Country | Date |
|---|---|---|
| 120,287 | Sweden | Nov. 25, 1947 |